3,069,830
HEATLESS FRACTIONATOR
Charles W. Skarstrom, Montvale, and William O. Heilman, Short Hills, N.J., assignors to Esso Research and Engineering Company, a corporation of Delaware
Filed Mar. 24, 1960, Ser. No. 17,417
7 Claims. (Cl. 55—58)

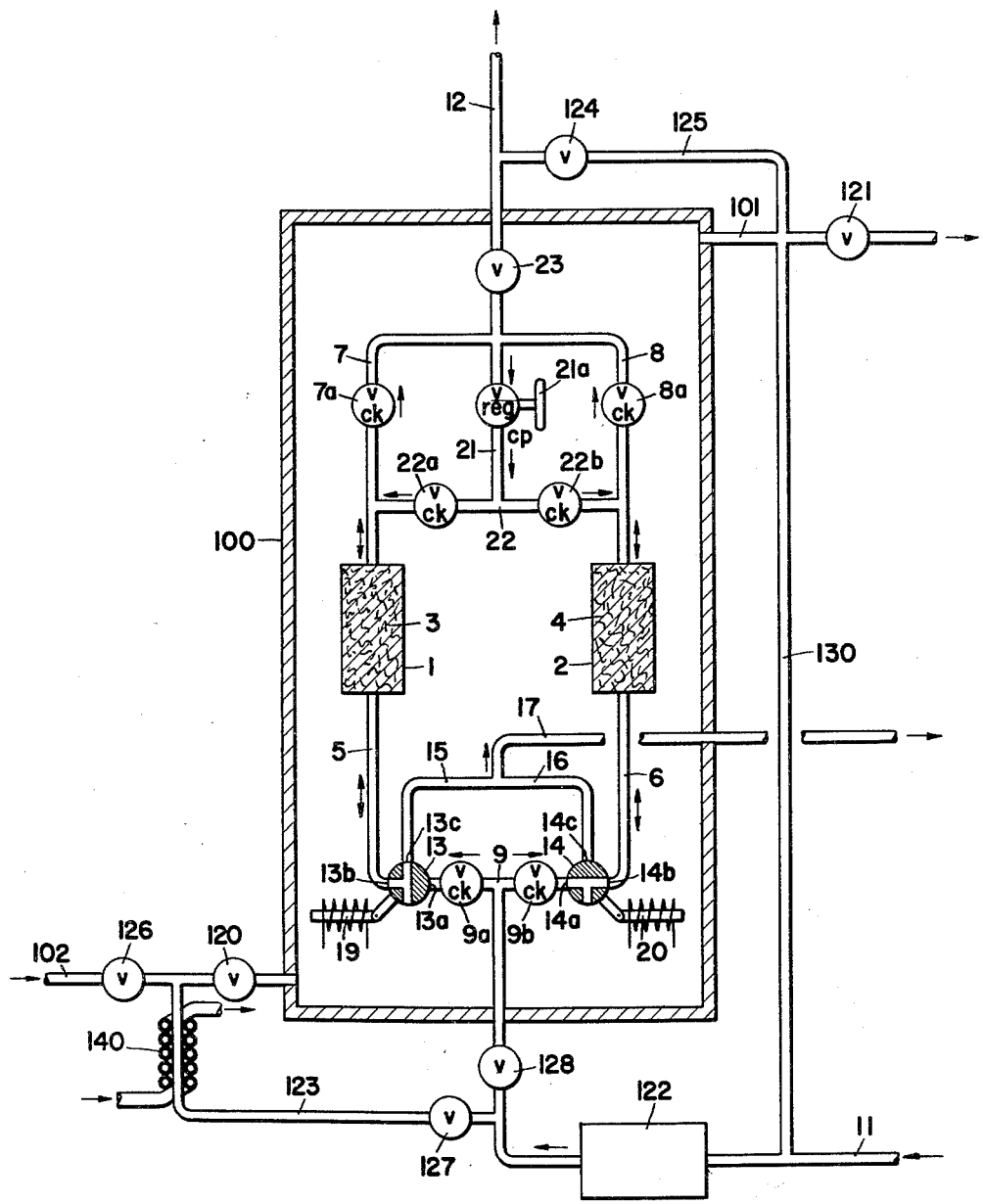
Charles W. Skarstrom
William O. Heilman   Inventors
By W. O. Heilman
Patent Attorney

United States Patent Office 3,069,830
Patented Dec. 25, 1962

The present invention is concerned with an improved method and an improved apparatus for fractionating gaseous mixtures. The invention comprises an improvement of the process and apparatus described in copending application, Serial No. 714,780, filed February 12, 1958, now Patent No. 2,944,627, issued July 12, 1960, entitled "Method and Apparatus for Fractionating Gaseous Mixtures," inventor Charles W. Skarstrom. In accordance with the present invention, the apparatus described in Patent No. 2,944,627 is encased so as to permit the maintenance of an area about the apparatus at a temperature which is substantially the temperature at which the separation is carried out. This permits novel techniques for processing chemical mixtures. In accordance with a specific adaptation of the present invention a portion of the incoming feed gas being processed in the beds is utilized to maintain the temperature in the area about the beds at the desired level.

The invention relates more particularly to a method and apparatus for removing one or more key components from a gaseous mixture or gas stream containing such components. The invention further relates to such a method and apparatus as employed for the separation from a gaseous mixture of one or more component contaminants. The invention also relates to a method and apparatus employed for the purpose of producing an effluent product wherein by removal of one or more components of the original mixture, the percentage concentration of more desirable components is increased in the resulting product. One specific adaptation of the invention relates to the drying of a gaseous mixture, such as air, by removal of water vapor. Also with specific reference, the invention relates to a method and apparatus whereby nitrogen is removed from a stream of atmospheric air to increase the concentration of oxygen in the effluent product stream. In addition, the invention relates to a method and apparatus whereby oxygen is removed from a stream of atmospheric air to increase the concentration of nitrogen in the effluent product stream. In this connection, the invention particularly relates to a combined system for separating air into its major components of oxygen and nitrogen, employing the fractionation method and apparatus herein disclosed. The invention is also concerned with the separation of various hydrocarbon gases one from the other, and for the removal of hydrogen, oxygenated compounds and the like from gaseous material containing the same.

In various industrial processes, moisture-free or oxygen- or nitrogen-rich air streams are essential to proper operating procedures. Many methods and a variation of apparatus combinations are known or have been proposed to obtain such ends. Most involve either complicated procedures or equipment expensive to assemble and operate. It is an object of the present invention to provide a simple method and apparatus which, with minor modification, may be employed in a multitude of situations where the purification or concentration of gaseous mixtures is desired. Specifically, the objects of the present invention may be stated as follows:

(1) To provide a separation system such as an adsorption system or diffusion system for the drying of air or other gaseous materials, without need for employment of extraneous heat to restore the adsorbent used in the system.

(2) To provide such a system, wherein relatively small amounts of adsorbent material are required for efficient operation, and therefore, wherein expenditures for equipment are considerably reduced.

(3) To provide a method and apparatus whereby oxygen and/or nitrogen-rich products may be recovered from atmospheric air without liquefaction or other expensive or complicated procedures.

(4) To provide a method and apparatus whereby a gaseous mixture may be fractionated to provide a series of effluent product streams in which each such effluent stream is rich in at least one component portion of the gas mixture supplied to the system as a feed material.

The terms "gas" and "gaseous" as employed in the following description or claims are intended to include not only materials that are conventionally considered to be gases, but also those materials conventionally considered to be vapors. Also the term "key component" as employed in the following description or claims is used to designate the component or components selectively adsorbed from a stream of a gaseous material initially fed to the system.

The invention and its objects may be more fully understood from the following description when it is read in conjunction with, and with reference to the accompanying drawing. The drawing is a diagrammatic showing of an apparatus according to the present invention, illustrating flow connections and controls adapted to accomplish the method contemplated.

In the apparatus as shown, the numerals 1 and 2 each designates one of a pair of adsorber vessels. Each vessel is adapted to contain and be substantially fully packed with an adsorbent material, to be later described in detail. As shown, the adsorbent packing material in vessel 1 is designated by the numeral 3, and that in vessel 2 by the numeral 4.

Each vessel is equipped with conduit connections providing for the passage of untreated or treated gaseous materials through the respective vessels and for otherwise handling such materials in the system. The numerals 5 and 6 respectively designate combined input and purge conduits for the respective vessels 1 and 2, and the numerals 7 and 8 correspondingly designate primary effluent discharge conduits. Each of the conduits 5 and 6 is connected at its outer end to a common inlet manifold conduit 9, and each of the conduits 7 and 8 are in turn connected to a common discharge manifold conduit 10. A conduit 11 for introducing an initial gaseous material feed into the system is connected to the inlet manifold 9, while a conduit 12 connects with the discharge manifold 10 to provide for discharge of a first product effluent from the system.

The numerals 13 and 14 designate respective elements of a pair of three-port, flow-switching valves connected in the manifold 9 on opposite sides of the connection thereto of the feed or supply conduit 11, and respectively intermediate such connection and the conduits 5 and 6. Check valves 9a and 9b are also disposed in the manifold between the supply conduit connection thereto and the respective valves 13 and 14. These check valves are adapted to permit flow only in the direction of the valves 13 and 14 respectively. In the respective valves 13 and 14, the ports are designated by the letters a, b and c plus the numeral designating the valve. In each valve the port a is connected to that portion of the manifold 9 communicating directly with the supply conduit 11; the port b is connected to that portion of the manifold communicating directly with a corresponding input and purge conduit such as 5 or 6; and the port c is connected to a conduit for discharge of a second effluent from one of the adsorber vessels. As shown, the ports 13a and 14a are connected to communicate through manifold 9 with supply conduit 11; ports 13b and 14b are connected to communicate through manifold 9 with conduits 5 and 6 respectively; and the ports 13c and 14c are connected to discharge conduits 15 and 16 respectively, for discharge of a secondary effluent from the respective vessels 1 and 2. The conduits 15 and 16 in turn communicate with a common discharge conduit 17 through a manifold connection 18.

The valves 13 and 14 are preferably provided for automatic, cyclical operation so as alternately to connect one of the vessels 1 and 2, through their respective conduit connections 5 and 6 and manifold 9, with either the supply conduit 11 or an effluent discharge conduit connection 15 and 16 respectively. In the drawing, the valves 13 and 14 are representatively equipped for automatic operation as by means of solenoids 19 and 20 respectively. Also, as thus equipped, the solenoids 19 and 20 are preferably activated by means such as a cycle timing device, not shown.

In the apparatus illustrated, the valve 13 has been actuated to provide for purge discharge from the vessel 1 through conduits 5, 9 and 15 by way of valve ports 13b and 13c. At the same time, or slightly in advance, the valve 14 has been actuated to provide for introduction of a gaseous feed material into the vessel 2 through conduits 11, 9 and 6 by way of the valve ports 14a and 14b. Subsequent operation of the valves in a regular cycle, as later described, would accomplish an opposite relationship of the valves to their respective conduits and communicating vessels.

Now referring further to the conduit connections which include the conduits 7 and 8 and manifold 10, as shown, the latter is provided with a branch conduit connection 21 in which is disposed a pressure reducing control valve 21a. This valve may be differential control valve designed to maintain a relatively constant pressure differential between the inlet and the outlet ports thereof. Flow through the valve is always in the direction indicated by the arrows.

The numeral 22 designates a conduit cross connection between the conduits 7 and 8, which cross connection 22 includes check valves 22a and 22b adapted to close against flow from and to open for flow toward the respective conduits 7 and 8. Check valves 7a and 8a respectively provide against flow through the conduits 7 and 8 in the direction of the respective vessels 1 and 2 with which these conduits communicate.

In accordance with the preferred adaptation of the present invention, an encasing element 100 is positioned about cylinders 1 and 2. In the area between the cylinders 1 and 2 and the encasing member 100, a temperature is maintained which is either above or below the temperature without encasement 100. The temperature maintained in this area is a temperature at which the particular operation is carried out in cylinders 1 and 2. Thus, by way of example, a fluid at the desired temperature is introduced into the area by means of line 102 and withdrawn by means of line 101.

In accordance with the present process this fluid comprises at least a portion of the fluid being processed. Thus the fluid to be processed is introduced into the system by means of line 11 and then heated or cooled to the desired temperature in zone 122. That portion of the fluid to be processed by pressure cycling is passed through valve 128 and then handled as herein before described. That portion of the fluid to be utilized to maintain the temperature in said area at the desired level is passed through valve 127 then through line 123, through valve 120 and into said area through line 102. In accordance with a specific adaptation under certain conditions that portion of the feed gas to be utilized in said area may be further heated or cooled.

Under certain conditions and types of operation this portion of the feed gas may be intermixed with other fluids such as heated air, heated gas, steam or water, a heated liquid, a vaporized liquid, etc. This latter fluid if utilized is introduced into the system by means of valve 126.

It is to be understood that heating elements such as electrical heaters, gas burners and the like, may be maintained in the area within the encasement to further assist in maintenance of the desired temperature therein.

To maintain said area at the desired temperature level the fluid is withdrawn from encasement 100 by means of line 101 and may be withdrawn from the system through valve 121. However, it is preferred in many operations to recombine that portion of the feed utilized to heat said area by means of line 125 valve 124 and to introduce said portion of the feed into line 12. Also under other operations at least a portion of the fluid withdrawn by means of line 101 is reintroduced into line 11 by means of line 130.

Reverting now to the adsorbent packing material designated in the vessels 1 and 2 by the numerals 3 and 4 respectively, this material may be any adsorbent material which has a selective affinity for one or more of the components of the gas mixture supplied to the system by way of the conduit 11. As shown, the adsorbent material is uniform and continuous throughout each vessel. If desired, however, the vessels may be packed with a number of different adsorbent materials arranged in layers. In such instance, it is preferred that the layers be physically separated. For example, separator plates may be introduced to extend diametrically across the vessel, or each adsorbent may be prepacked in a suitable carrier container and the several containers inserted to form a series from one end of a vessel to the other.

Depending upon the operation contemplated, the adsorbent employed may be selected from such materials as activated carbon, alumina, silica gel, glass wool, adsorbent cotton, and even soft tissue paper. Various metal oxides, clays, fuller's earth, bone char, etc., also have adsorbent characteristics which may be utilized according to the present invention. Still another adsorbent material of the character contemplated is one known as Mobilbeads, which is a siliceous moisture adsorbing compound.

Other adsorbent materials suitable for employment according to the present invention include materials known as molecular sieves. This class of materials includes certain zeolites, both naturally-occurring and synthetic, which have crystalline structures containing a large number of small cavities interconnected by a number of still smaller holes or pores, the latter being of exceptional uniform size. The pores may vary in diameter from 3 to 5 Angstrom units, to 10 to 15 or more. For a particular molecular sieve material, however, the pore sizes are substantially uniform and accordingly the material normally will be designated by the characteristic size of its pores.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. 2,442,191. Zeolites vary somewhat in composition, but generally contain silica, aluminum, oxygen, and an alkali and/or alkaline earth element, e.g., sodium and/or calcium, magnesium, etc. Analcite has the empirical formula $NaAlSi_2O_6.H_2O$. Barrer (U.S. 2,306,610) teaches that all or part of the sodium is replaceable by calcium to yield, on dehydration, a molecular sieve having the formmula $(CaNa_2)Al_2Si_4O_{12}.2H_2O$. Black (U.S. 2,522,426) describes a synthetic molecular sieve having the formula $4CaO.Al_2O_3.4SiO_2$.

The synthesis of molecular sieves having uniform pore sizes of 4 and 5 Angstrom units may be accomplished by mixing an aqueous solution of an alkali metal silicate having a ratio of alkali metal oxide/$SiO_2$ of about 0.8 to 1 or higher with a solution of sodium aluminate having a ratio of $Na_2O$ to $Al_2O_3$ of about 1/1–3/1 at a temperature of from about 160° to about 215° in such proportions as to give a ratio of $SiO_2$ to $Al_2O_3$ in the mixture of 0.5–3/1. The mixture is held at the stated temperatures for a period of time sufficient to form a crystalline sodium aluminosilicate, which is a molecular sieve material having a uniform pore size of about 4 Angstrom units. A pore size of about 5 Angstrom units may be produced in this material by base exchange reaction with an alkaline earth metal such as calcium, in the form of calcium chloride for example. In either instance, the molecular sieve material produced is water washed and activated by calcining.

The synthesis of a molecular sieve material having a pore size of about 13 Angstrom units may be produced by mixing an aqueous solution of an alkali metal silicate having a ratio of alkali metal oxide/$SiO_2$ of about 1/1 or higher with a solution of sodium aluminate having a ratio of $Na_2O$ to $Al_2O_3$ of 1/1–3/1 at 160° to about 250° F. in proportions such as to give a ratio of $SiO_2$ to $Al_2O_3$ in the mixture of 3/1–10/1. This mixture is then held at the stated temperatures for at least an hour, and preferably longer, thereby producing the molecular sieve material desired. The recovered sieve material is water washed and activated by calcining.

A large number of other natural-occurring zeolites have molecular sieve activity, i.e., the ability to selectively adsorb certain components or component portions of a gaseous mixture. This selectivity stems from the fact that only molecules small enough to enter the pores will be adsorbed. Molecule size alone, however, is not the sole requirement for selective adsorption. It appears that a relative affinity of a molecule for the adsorbent as compared to other molecules or an initial relative rate of adsorption phenomena must be present. Of the materials contemplated for use according to the present invention, one having a uniform pore size of about 4 Angstroms has been found especially suitable for concentration of nitrogen in a primary effluent product derived from atmospheric air. A molecular sieve material having a uniform pore size of about 5 Angstroms has been found to be a satisfactory adsorbent for the concentration of oxygen in the primary effluent product derived from atmospheric air, according to the present invention. When employed in substantially the same manner as the 5 Angstrom pore size molecular sieve material, a molecular sieve material having a uniform pore size of about 13 Angstroms also has been found to be suitable for the concentration of oxygen in the primary effluent product derived from atmospheric air. Each of the molecular sieve materials mentioned also exhibits an affinity for moisture, and to some extent carbon dioxide. Accordingly, the primary effluent product derived by the use of these materials from a feed stream of atmospheric air will not only be rich in either nitrogen or oxygen, according to the material used, but also will be dry.

The 4 A., 5 A. and 13 A. molecular sieve materials have certain characteristic affinities for particular types of hydrocarbons. In this respect, the adsorptive characteristics of 4 A., 5 A. and 13 A. molecular sieves are represented in the following table:

| Adsorbed on 4 A. and 5 A. | Adsorbed on 5 A. but not 4 A. | Not adsorbed on 4 A. or 5 A. | Adsorbed on 13 A. |
| --- | --- | --- | --- |
| (1) Ethane. | (1) Propane and higher n-paraffins. | (1) Iso-paraffins. | (1) All hydrocarbons within gasoline boiling range. |
| (2) Ethylene. | (2) Butene and and higher n-olefins. | (2) Aromatics. | (2) Aromatics strongly adsorbed. |
| (3) Propylene. | | (3) All cyclics with 4 or more atoms in ring. | (3) Diolefins strongly adsorbed. |

As indicated from this table the method and apparatus according to the present invention may be employed for the separation of materials such as ethane, ethylene, or propylene from a mixture with propane and higher n-paraffins or butene and higher n-olefins by the use of 4 A. sieves. Likewise, isoparaffins, aromatics and all cyclics with 4 or more atoms in the ring may be separated from any of the previously mentioned hydrocarbon material by the use of either 4 A. or 5 A. molecular sieves.

As has been indicated above, many of the adsorbent materials listed are selected for more than a single key component. For example, activated alumina may be employed to adsorb water vapor and carbon dioxide simultaneously from a gaseous mixture in which they may be present, while silica gel adsorbents, including Mobilbeads, although adsorbent for water vapor, have only slight affinity for carbon dioxide. Preferably the adsorbent material employed is one which has an affinity for those components not desired in a primary effluent product, or which may be most advantageously recoverable from a secondary effluent product, both as later identified.

In the preferred practice of the method, according to the present invention, a stream of gaseous mixture under positive pressure is passed, cyclically and in alternating sequence, through each of two paired adsorption zones, the ambient atmosphere of the zones being substantially maintained at a temperature such as to maintain the feed material and the effluent products in a vapor or gas phase. The stream introduced into each zone is passed over and through a body of an adsorbent contained in the zone, which adsorbent material has a selective affinity for at least one key component portion of the mixture. During passage of the original feed stream of the mixture through a zone, the zone is on an adsorption cycle.

During this cycle, the zone is maintained at substantially the pressure of the original feed stream introduced thereinto. After passage through the zone, a gaseous effluent product is discharged from the zone under substantially the pressure of the initial stream.

While either zone is on an adsorption cycle, pressure on the other zone of the pair is reduced, as by opening it to the atmosphere or another zone of reduced pressure. In this condition, the other zone is on a desorption cycle. At substantially the same time, a portion of the primary effluent product from the zone then on an adsorption cycle is withdrawn from the total primary effluent discharge, and this withdrawn portion is introduced into the reduced pressure zone, which is on a desorption cycle, so as to pass over and through the body of the adsorbent contained therein. Passage of this withdrawn portion through the zone on desorption cycle is in counterflow relation to passage of the initial stream passed through such zone while it was on adsorption cycle. As thus introduced, the discharged primary effluent product is relatively free of the key component or components retained by and present in the adsorbent contained in the zone on a desorption cycle. Also the adsorbent therein will have been slightly heated by the heat of adsorption induced during a previous adsorption cycle. By proper adjustment of the adsorption-desorption cycle periods, the heat of adsorption during the pressure cycle is conserved and available to counteract the effects of cooling produced during the desorption cycle.

One great advantage of the present process is the conservation of heat evolved on the adsorption cycle. Processes as heretofore known in the art conducted the adsorption cycle for a period sufficient to raise the temperature appreciably, thereby permitting or causing heat to flow through the bed, as well as through the walls of the adsorption vessel, thus to be substantially lost. In accordance with the present invention, wherein rapid cycling is employed between the adsorption and the desorption phases, the delta T on the adsorption zone is relatively small. This tends to greatly reduce the flow of heat. Due to the short time on the adsorption cycle, heat will not have time to flow through the bed, and through the walls of the vessel into the surrounding atmosphere. By rapid cycling from adsorption to desorption in the respective zones, the desorption cycle will substantially completely utilize the heat produced during the adsorption cycle. As pointed out above, this is due to the low delta T attained, and due to the lack of time for dissipation of the heat of adsorption. In effect, the beds function as highly efficient, rapidly cycled, bead heat exchangers. Generally, the time on the adsorption cycle in accordance with the present invention does not exceed 2–3 minutes and is preferably less than one minute. A very desirable time on the adsorption cycle is less than 20 seconds as, for example, 10 seconds. The particular times utilized depend upon various factors, such as the particular adsorbent utilized, the height of the bed, the nature of the key component, and other operating variables.

The combination of temperature and reduced pressure, plus the flushing or scavenging effect of the primary effluent product reflux portion used for backwashing, prepares the adsorbent to adsorb the key component or components from the stream of the gaseous mixture introduced during the next adsorption cycle for this zone. Desorption of the adsorbed key component is additionally facilitated by the fact that the gaseous mixture constituting the primary effluent product reflux portion which is passed through the zone has acquired a renewed capacity to take up the key component desorbed from the adsorbent. In effect, the desorption step, accomplished in one zone of a pair of zones, involves a backwashing action by the primary effluent product reflux portion withdrawn from the primary product stream discharged from the contemporary adsorption cycle of the other zone in such pair, and may be accomplished without addition of heat from an outside source.

For the purpose of this description, the effluent discharged from a zone which is on its adsorption cycle is termed the "primary effluent product," while the effluent discharged from a zone which is on its desorption cycle is termed the "secondary" effluent product. In the primary effluent product, the key component or components will be present in a minimum concentration. In the secondary effluent product, the key component or components will be present in a maximum concentration.

As a result of the backwashing step for desorption of the key component or components from the absorption zones, to a degree, the components of the secondary effluent product will correspond to those of the initial feed of the gaseous mixture. The primary effluent product normally will be the product toward which the method is directed. Where the secondary effluent product has no specific utility, as where the adsorbed key components may be such as water vapor and small amounts of carbon dioxide, during its desorption cycle, the discharge from either zone may be vented to the atmosphere, or otherwise disposed of as a waste product. Where the secondary effluent may be such as to warrant recovery of the adsorbed key components, it may be discharged to an accumulator or storage zone, or fed to a suitable recovery or treating zone directly, in any suitable fashion.

One technique of the present invention requires the entire apparatus to be heated so that liquid mixtures will be in the vapor state within the apparatus.

With this "hot ambient," selective vapor adsorption can be carried out without the aid of heat other than to maintain the environment of the apparatus. Adsorption is done at high pressure. Bed regeneration is accomplished at lower pressure with backwash of some of the unadsorbed product. With rapid cycling of a two or more bed system, the heat liberated during adsorption is not lost. It is retained in the bed to furnish the necessary heat for desorption. The adsorbent beds act as cycling bead heat exchangers.

Feed flow and cycle time are adjusted to keep the temperature cycle small in the adsorbent beds, above and below the ambient. The reasons are:

(1) To minimize heat losses and gains to the ambient.

(2) The absorbent capacity of the bed diminishes as it becomes hotter. Small temperature rise on adsorption tends to maximize capacity per cycle.

(3) The capacity increases as the bed gets colder. Small temperature fall on desorption allows a minimum amount of product backwash gas flow.

The amount of product used to backwash a bed during desorption must have a volume, measured at the low pressure, at least equal to the volume of feed, measured at high pressure, which went into the bed during the adsorption step. By keeping the actual backwash volume slightly in excess of the actual feed volume for each complete and quick cycle, the composition gradient of adsorbed components is swept back during desorption as far as it was swept forward during adsorption. When sufficiently long beds make channeling negligible, complete removal of adsorbable components is feasible in the product stream.

The following are typical applications of hot heatless fractionation:

(1) Removal of benzene and olefins from a $C_5/C_6$ naphtha. Useful for isomerization feed preparation. Use activated alumina, 13X molecular sieves or other adsorbent having preferential affinity for benzene and olefins.

(2) Removal of $nC_6$ from $C_6$ virgin naphtha fraction. Use 13X molecular sieves to hold back $nC_6$ and pass $iC_6$.

(3) For dewaxing of lube oils. Removal of paraffins from naphthenes over molecular sieves or other adsorbent which adsorbs paraffins in preference to other components of lube oils.

(4) Removal of high boiling compounds from $C_4$, $C_5$, $C_6$, $C_7$ and $C_8$ streams which cause sludge or catalyst coking. This will sharpen and reduce the end points of these fractions for better refinery processing. This can be done over activated carbon, activated alumina, molecular sieves, etc., or combinations thereof.

By following the technique of the present invention, it is possible to segregate a key component from a normally liquid fraction. In essence, this is done by heating the liquid fraction so as to convert the constituents thereof into the vapor phase. This vapor phase is introduced into the system by means of line 11 from the heating zone or vaporization zone, not shown. If it be assumed that this vaporized fraction is introduced through line 11 at a temperature of about 650° F., then in accordance with the present invention, the temperature maintained within container 100 is about 650° F. On the other hand, if the temperature of the vaporous stream introduced by means of line 11 is about 1,000° F., then the temperature within the container is maintained at about 1,000° F. as hereinbefore described. In other words, the temperature within container 100 is approximately the same as the temperatures maintained within zones 1 and 2 for the adsorption operation.

The primary effluent withdrawn by means of line 12 may be condensed by usual techniques as well as the stream withdrawn by means of line 17. It is within the scope of the present invention to carry out heat exchange between the ingoing and outgoing stream in a manner understood by the art. It is also within the scope of the present invention to have a vacuum pump on line 17.

It is within the scope of the present invention to recompress the secondary effluent and reintroduce this condensate to the feed stream in order to build up a concentration of trace components in the secondary effluent recycle stream until a high concentration is attained.

The present invention may be more readily understood by the following example illustrating the same:

*Example*

In a conventional isomerization process, utilizing a pentane, hexane naphtha feed, it is necessary to remove benzene from the feed, particularly, when using an aluminum bromide catalyst. The feed normally comprises 20 to 40% by volume of pentane, 1 to 10% benzene, normally about 3% benzene, and the remaining hydrocarbons, hexane and a small amount of cyclopentane and cyclohexane. The physical data are as follows:

| Vol. percent: | | Saturated vapor pressure—dew points | |
|---|---|---|---|
| | | 5 atmospheres, °C. | 10 atmospheres, °C. |
| 23 | Pentane | 92.4 | 125 |
| 74 | Hexane | 132 | 167 |
| 3 | Benzene | 143 | 179 |

In accordance with the present invention, the high pressure zone when utilizing activated alumina, would be run at a temperature in the range from 160° to 170° C. at 5 atmospheres absolute pressure, and the low pressure zone would be operated at the same temperature at ⅓ atmosphere absolute pressure. In accordance with the present invention, this temperature is carried in the area within the beds by the preheating of a portion of the feed and then circulating this portion of the feed about the beds.

Another technique of the present invention requires that the entire apparatus be cooled so that the temperature within container 100 approximates the temperature within zones 1 and 2 during the adsorption operation. Thus, if a feed stream introduced by means of line 11 is, for example, −100° F., it is contemplated that the temperature within zone 100 be approximately −100° F. As pointed out heretofore, the invention embraces the conception that the entire area within container 100 is maintained at the temperature at which the separation process is carried out by the introduction of a suitable cooling or heating means, or by the use of heaters or coolers positioned within container 100.

As pointed out above, the present invention is concerned with a method of fractionating a gaseous material. In essence, the operation comprises flowing a stream of gaseous material through a bed of adsorbent at a preselected initial pressure and flow direction. The adsorbent is selective for at least one component fraction of said material. The stream is flowed through the bed for a first cycle period less than that required for the bed to come to equilibrium with the component fraction. A primary effluent product comprising an unadsorbed portion of the feed stream is discharged from the bed. At the end of the first cycle period, the flow of the feed stream is interrupted and the initial pressure on the bed reduced. The adsorbed components are desorbed from the bed at the reduced pressure. These desorbed components are discharged from the bed in a flow direction opposite to the flow direction of the feed stream of the gaseous material for a second cycle period. During the second period at least a portion of the primary effluent product is passed through the bed in a flow direction of the desorbed component fraction. This latter mixture comprising a portion of the primary effluent product and the desorbed component is discharged from the bed as a secondary effluent product. The cycle periods are adjusted for a time duration adapted to develop a concentration gradient of the component fraction in said bed wherein the gradient has a front of lowest concentration in a zone intermediate the ends of the bed. An oscillatory movement is imparted to the front substantially within the limits of the zone in a direction and for a distance which corresponds respectively to the direction of the flow through the bed during each cycle period and to the duration thereof.

In accordance with the above, the single zone is encased in a container 100 or equivalent.

The amount of feed circulated to the area about the beds as compared to that volume of feed processed through the beds may vary appreciably depending upon the particular fractionation operation being conducted, the temperature of operation, the pressures employed, and other operating variables. Generally the amount of feed passed about the bed as compared to the quantity of feed processed through the beds is in the range of about 25% to 75% by volume as compared to the total feed.

What is claimed is:

1. A process for the removal of a key component from a gaseous mixture stream at a temperature other than atmospheric, utilizing two adsorbent beds each of which is characterized by having a one end and an other end, said process comprising the steps of flowing at a temperature other than atmospheric a feed stream of a gaseous mixture including a key component from one end to the other end through a first bed of an adsorbent initially relatively free of said key component at a preselected initial relatively high pressure and in a positive flow direction in an initial cycle, said adsorbent being preferentially selective for said key component; discharging said gaseous mixture stream from said first bed as a primary effluent; segregating a portion of said primary effluent as a product stream and withdrawing the same; passing the remainder of said primary effluent in reverse flow from the other end to the one end through a second bed of adsorbent at a relatively low pressure, which adsorbent is relatively saturated with said key component as compared to said first bed at the start of said initial cycle, whereby as said initial cycle continues, said first bed becomes relatively saturated with said key component progressively from said one end toward said other end, and whereby said second bed becomes relatively freed from said key component from said other end toward said one end; continuing said initial cycle for a time period less than that required to secure saturation of said first bed at said other end and that required to secure freedom from said key component of said second bed at said one end; thereafter introducing said feed stream into said one end of said second bed in positive flow direction at said initial relatively high pressure; discharging said gaseous mixture stream from said other end of said second bed as a primary effluent; segregating a portion of said last named primary effluent as a product stream and withdrawing the same; passing the remainder of said last named primary effluent in reverse flow from said other end to said one end through said first bed of adsorbent at said relatively low pressure, and thereafter cyclically continuing the operation, and maintaining the area about said beds at said temperature by pretreating said feed stream to said temperature, passing one portion into said first bed and circulating the remaining portion of siad feed stream about said area, withdrawing the remaining portion circulated about said area and combining the same with said feed stream prior to pretreating said feed stream.

2. Process as defined by claim 1 wherein said temperature is greater than atmospheric temperature.

3. Process as defined by claim 1 wherein said temperature is below atmospheric temperature.

4. Process as defined by claim 1 wherein said temperature is about 200° to 1,000° F. above atmospheric temperature.

5. Process as defined by claim 1 wherein said temperature is 50° to 300° F. below atmospheric temperature.

6. Process as defined by claim 1 wherein the amount of feed stream circulated about said area is in the range from about 25% to 75% by volume as compared to the total feed.

7. An apparatus for adsorptive fractionation of a gaseous mixture, said apparatus consisting essentially of (1) two separately defined chamber vessels, (2) a body of adsorbent material in each of said vessels, said bodies being preferentially adsorptive of at least one and the same component of said mixture, (3) primary inlet conduit means connected to each of said vessels wherethrough said gaseous mixture may be supplied to said vessels, (4) valve means in said primary inlet conduit means whereby the supply of said gaseous mixture to said vessels may be alternated from vessel to vessel, (5) primary outlet conduit means connected to each of said vessels wherethrough gaseous material may be removed from said vessels as a primary effluent product, said primary outlet conduit means and said primary inlet conduit means being so connected to said vessels to establish therebetween in each vessel a primary path of flow of gaseous material through each of said bodies of adsorbent material, (6) reflux conduit means connected to each of said vessels wherethrough at least a portion of said primary effluent product removed from either of said vessels may be directed into the other vessel, said reflux conduit means including pressure reducing means, (7) secondary outlet conduit means connected to each of said vesels wherethrough gaseous material may be removed from said vessels as a secondary effluent product, said secondary outlet conduit means and said reflux conduit means being so connected to said vessels to establish therebetween in each vessel a secondary path of flow of gaseous material through each of said bodies of adsorbent material which is substantially coincident with and opposite in direction to said primary path of flow therethrough, and (8) valve means in said secondary outlet conduit means whereby the removal of said secondary effluent product from said vessels may be alternated from vessel to vessel, and said apparatus being characterized by the absence of means for supplying heat from any external source to either of said bodies of adsorbent material therein and also by the absence of means for rejecting heat from either of said bodies of adsorbent material therein to any external source, (9) an encasement enclosing said separately defined chamber vessels, (10) means for introducing a portion of said gaseous mixture into said encasement and (11) means for withdrawing said gaseous mixture from said encasement and for reintroducing said gaseous mixture into said primary inlet conduit means.

References Cited in the file of this patent

UNITED STATES PATENTS

| | | |
|---|---|---|
| 1,548,280 | Ray | Aug. 4, 1925 |
| 1,617,305 | Guyer et al. | Feb. 8, 1927 |
| 1,759,812 | Gray | May 20, 1930 |
| 2,612,512 | Moran | Sept. 30, 1952 |
| 2,709,496 | Baker | May 31, 1955 |
| 2,877,861 | Miller | Mar. 17, 1959 |
| 2,944,627 | Skarstrom | July 12, 1960 |